United States Patent [19]

Kruklitis

[11] 4,107,653
[45] Aug. 15, 1978

[54] DOCUMENT PROCESSING, MAGNETIC CHARACTER DETECTING APPARATUS

[75] Inventor: Karlis Kruklitis, Plymouth, Mich.

[73] Assignee: Burroughs Corporation, Detroit, Mich.

[21] Appl. No.: 799,243

[22] Filed: May 23, 1977

[51] Int. Cl.² .............................................. G06K 9/00
[52] U.S. Cl. .............................. 340/146.3 C; 235/449
[58] Field of Search ............................... 340/146.3 C; 235/61.11 D, 449, 450; 360/66, 16

[56] References Cited

U.S. PATENT DOCUMENTS

| | | | |
|---|---|---|---|
| 3,192,504 | 6/1965 | Miller | 340/146.3 C |
| 3,619,570 | 11/1971 | Grosbard | 235/450 |
| 3,638,238 | 1/1972 | Milford et al. | 340/146.3 C |
| 3,651,311 | 3/1972 | Berezin et al. | 235/450 |
| 3,755,652 | 8/1973 | Endo et al. | 235/449 |
| 3,879,754 | 4/1975 | Ballinger | 360/66 |
| 3,986,206 | 10/1976 | Fayling | 235/449 |

Primary Examiner—Leo H. Boudreau
Attorney, Agent, or Firm—Robert L. Kaner; Carl Fissell, Jr.; Kevin R. Peterson

[57] ABSTRACT

A document processing apparatus that detects magnetic characters on documents as they pass therethrough. The apparatus includes a transport path, pairs of wheels for driving the documents through the apparatus, a DC magnetic writing device and a magnetic reading device. The DC magnetic writing device orientates the magnetic dipoles of the characters on the documents; and the reading device detects the orientated dipoles of the characters. The writing device precedes the reading device and is provided by two magnets, one of which is located on each side of the transport path, with the magnets having like magnetic poles facing toward each other.

10 Claims, 3 Drawing Figures

DOCUMENT PROCESSING, MAGNETIC CHARACTER DETECTING APPARATUS

BACKGROUND OF THE INVENTION

1. Field of the Invention

This invention relates in general to document processing apparatus and more particularly to such apparatus that detect magnetic characters on documents.

2. Description of the Prior Art

Document processing apparatus often must detect magnetic characters on the documents they process. U.S. patent application Ser. No. 573,787 of Templeton and assigned to common assignee describes such an apparatus. The disclosed apparatus first orientates the magnetic dipoles of the characters in a predetermined fashion using a writing device and then detects the magnetic characters using a reading device.

One type of magnetic character detection apparatus detects characters that have been DC (unidirectionally) magnetized, that is the magnetic dipoles of the characters are aligned pointing in one general direction. Such magnetization has been accomplished utilizing a writing device located on only one side of the document transport path. Such device includes a U-shaped magnet having opposite magnetic poles on its legs. Magnetizable material extends from each leg toward the other leg and slightly above the open end of the U to form pole tips which are separated from each other by a small air gap, such as 0.08 mm. The document having magnetic characters thereon is moved adjacent to and past the gap. The magnetic characters are spaced from the pole tips and gap by a layer of non-magnetic material with a piece of resilient non-magnetic material extending from the other side of the transport path holding the document against the layer of non-magnetic material covering the pole tips and gap. Leaking flux in the vicinity of the air gap between the pole tips attempts to orientate the magnetic dipoles as the document passes thereby.

SUMMARY OF THE INVENTION

The present invention provides an improved magnetic character detecting apparatus and process that orientates the magnetic dipoles of the characters utilizing a strong magnetic field. The field is created by magnets on either side of a document transport path with such magnets having like poles facing toward each other.

A document processing, magnetic character detecting apparatus according to the present invention includes a transport path for guiding documents therethrough. A DC magnetic writing device, located along the transport path upstream from a magnetic reading device, orientates the magnetic dipoles of the characters on the documents in one direction. The writing device includes two magnets, one of which is located on each side of the transport path, with such magnets having like magnetic poles facing toward each other. The magnetic reading device, which is also located along the transport path, detects the orientated magnetic characters on the document. The apparatus also includes means for moving documents along the transport path past the writing device and the reading device.

The magnets of the writing device are on either side of the transport path such that the writing device does not have to restrict the width of the transport path. Thus, the writing device will not jam documents, and does not have any critically spaced parts that would require adjustment or tend to wear. However, the like poled magnets provide such a strong magnetic field in the transport path that it orientates the magnetic dipoles of the characters without critical positioning of the documents within the width of the transport path. The strong magnetic field is also believed to completely orientate all the magnetic dipoles of the characters in one direction to provide a condition referred to as saturation.

DETAILED DESCRIPTION OF THE INVENTION

Figure 1:
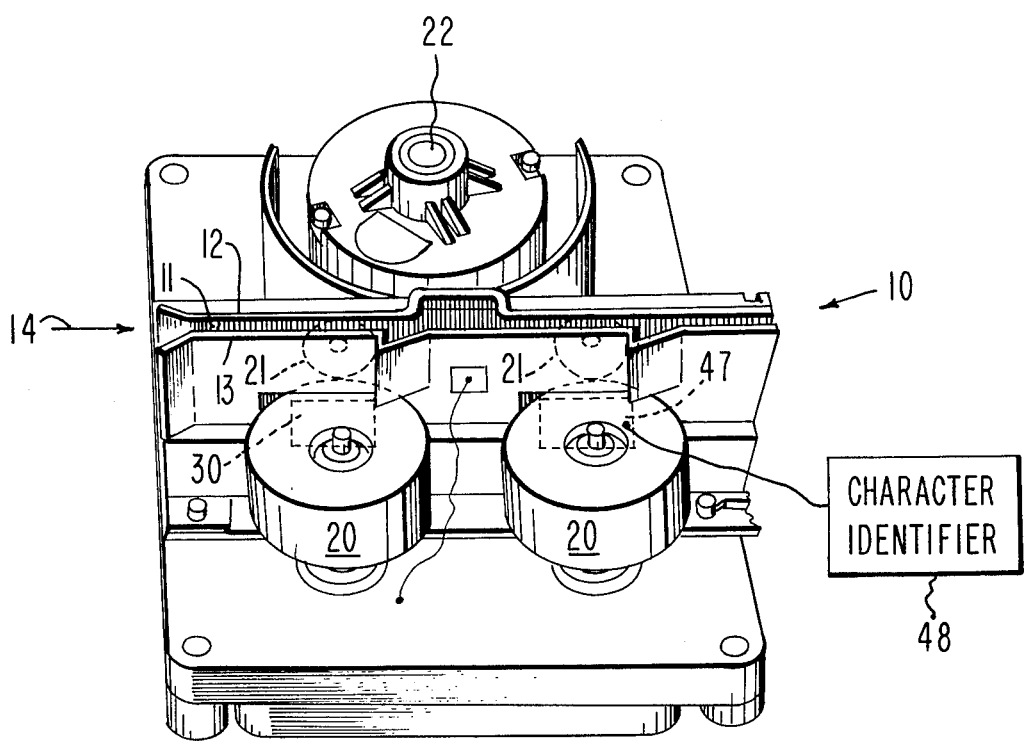
FIG. 1 is a perspective view of a document processing, magnetic character detecting apparatus according to the present invention.

A document processing apparatus 10 that detects magnetic characters on documents according to the present invention is shown in FIG. 1. Such apparatus may, for example, process bank checks and detect magnetic ink characters thereon as the checks pass through the apparatus. The magnetic ink characters on the checks may represent, for example, check amount, account number, bank number and/or federal reserve number.

The apparatus 10 includes a transport path 11 that is formed by a pair of generally opposed walls 12 and 13. The transport path guides the documents as they pass serially through the apparatus in the direction of the arrow 14.

The documents are driven along the transport path 11 by sets of drive rollers. Each set of drive rollers includes a drive wheel 20, rotated by a motor 22 via pulleys and drive belts located under the surface of the apparatus, and an idle roller 21 which is spring loaded against the drive wheel 20. The drive wheel-idle roller sets form a means for moving the documents along the transport path.

Figure 2:
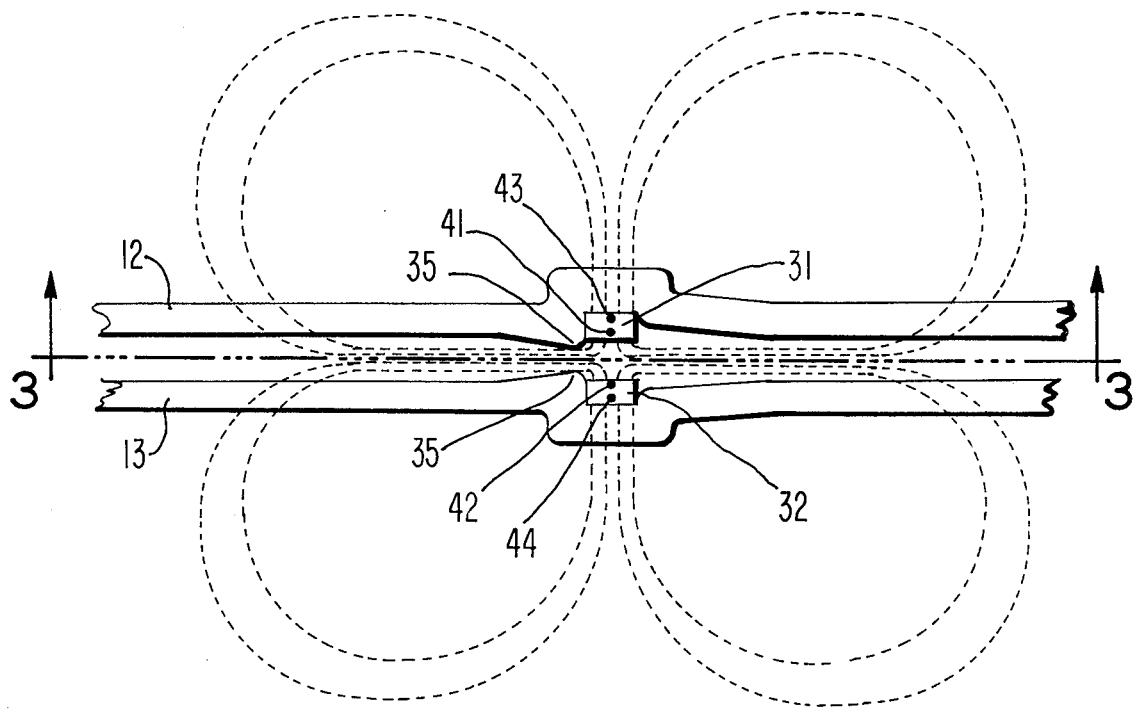
FIG. 2 is a partial top view of the apparatus with parts removed to show a magnetic writing device of the apparatus.
Figure 3:
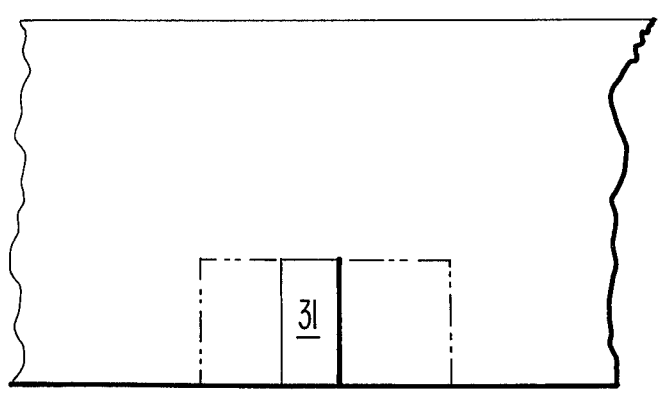
FIG. 3 is a partial sectional view of the apparatus along the lines 3—3 of FIG. 2.

As a document passes through the apparatus, it first passes by a DC magnetic writing device 30 that orientates the magnetic dipoles of the characters on the document. As shown in FIGS. 2 and 3, the magnetic writing device 30 includes magnets 31 and 32 located on opposite sides of the transport path. The magnets 31 and 32 may be permanent magnets that are magnetized to provide a magnetizing force which is greater than the coercive force of the magnetic dipoles on the document. Alternatively, the magnets could be, for example, electromagnets activated by DC (unidirectional) current. The magnets are mounted flush with their adjacent transport path walls but need not be so as long as they are located on opposite sides of the transport path. The walls of the transport path bend inward slightly at 35 to help guide the documents past the area of the path where the magnets are located in a smooth motion. The magnets 31 and 32 have like magnetic poles facing each other. Thus, for example, locations on the magnets indicated by 41 and 42 could both be south poles and locations on the magnets indicated by 43 and 44 could be north poles. Alternatively, locations 41 and 42 could be north poles and locations 43 and 44 could be south poles.

FIG. 2 shows the magnetic flux lines around the magnets 31 and 32 via dotted lines. The magnets are spaced sufficiently close together that their magnetic fields substantially interact to provide flux lines generally parallel to each other in the transport path. The field created by the magnets is sufficiently strong and parallel that the placement of the moving document within the width of the transport path is not critical. Thus, the writing device 30 does not have any critical spacing adjustments, and does not have any frictional areas to wear and/or cause document jams. The strong magnetic field is also believed to completely orientate all the magnetic dipoles of the characters in one direction to provide a condition referred to as saturation.

As a character on a document first enters the fields created by the magnets, the magnetic dipoles of the character are orientated in a first direction by the fields. As the character passes by the magnets and leaves the fields created by the magnets, the magnetic dipoles of the character are orientated in the opposite direction and remain orientated in this opposite direction after they have left the magnetic fields. This opposite direction is referred to herein as the one direction in which the dipoles are orientated.

The magnetic characters on the document then pass by a magnetic reading device 47 that detects the orientated characters. The reading device can be a Burroughs Corporation model 2716-3054. Such a reading device is basically a laminated alloy of magnetic materials and has a narrow gap that is located generally perpendicular to the direction of motion of the document and generally perpendicular to the orientation of the magnetic dipoles. As the document passes by the reading device, it is held against the reading device by a flexible resilient member and the reading device detects current induced in a coil wound around the laminated magnetic material. The entire document passes by the magnetic reading device and passes out of the apparatus.

The currents detected by the reading device may be processed and identified as characters by a character identifier 48 via techniques well known in the art such as disclosed in U.S. Pat. Nos. 3,987,411 to Kruklitis et al., 3,221,303 to Bradley and 3,103,646 to Sheaffer et al which patents are incorporated herein by reference. Such techniques provide means for identifying the characters detected by the reading device.

The apparatus of the present invention may be used in a high speed document processor such as a bank check reader-sorter. Such a device typically has a feeder for serially feeding documents from a stack of documents. The documents are operatively fed through a magnetic character detecting apparatus such as disclosed herein and then they are operatively fed to a sorter where they are sorted into groups based upon information detected from the magnetic characters on the documents.

What is claimed is:

1. A method of detecting magnetic characters on documents where the dipoles of the magnetic characters may not be unidirectionally orientated, comprising:
   moving documents serially along a document transport path;
   orientating the magnetic dipoles of the characters on the documents in one direction by passing the documents between two magnets, one located on each side of the document transport path, with such magnets having like unidirectional magnetic poles facing toward each other; and
   detecting the unidirectionally orientated magnetic characters on the documents as the documents pass along the transport path.

2. A method of identifying magnetic characters on documents where the dipoles of the magnetic characters may not be unidirectionally orientated, comprising:
   moving documents serially along a document transport path;
   orientating the magnetic dipoles of the characters on the documents in one direction by passing the documents between two magnets, one located on each side of the document transport path, with such magnets having like unidirectional magnetic poles facing toward each other;
   detecting the unidirectionally orientated magnetic characters on the documents as the documents pass along the transport path; and
   electronically identifying the magnetic characters detected.

3. A document processing apparatus that detects magnetic characters on documents, comprising:
   a transport path for guiding one of said documents;
   a DC magnetic writing device located along said transport path for orientating the magnetic dipoles of the characters on the documents in one direction, said writing device comprising two magnets, one of which is located on each side of said transport path, said magnets having like unidirectional magnetic poles facing toward each other;
   a magnetic reading device located along said transport path for detecting the orientated magnetic characters on said documents; and
   means for moving said documents along said transport path past said magnetic writing device and said magnetic reading device.

4. A document processing apparatus according to claim 3 wherein the magnets of said writing device are permanent magnets.

5. A document processing apparatus according to claim 3 wherein said magnets provide a magnetizing force greater than the coersive force of the magnetic characters to be orientated.

6. A document processing apparatus according to claim 3 wherein the magnetic characters are magnetic ink characters.

7. A document processing apparatus that identifies magnetic characters on documents, comprising:
   a transport path for guiding one of said documents;
   a DC magnetic writing device located along said transport path for orientating the magnetic dipoles of the characters on the documents in one direction, said writing device comprising two magnets, one of which is located on each side of said transport path, said magnets having like unidirectional magnetic poles facing toward each other;
   a magnetic reading device located along said transport path for detecting the orientated magnetic characters on said documents;
   means responsive to said magnetic reading device for identifying the magnetic characters detected by said reading device; and
   means for moving said documents along said transport path past said magnetic writing device and said magnetic reading device.

8. A document processing apparatus according to claim 7 wherein the magnets of said writing device are permanent magnets.

9. A document processing apparatus according to claim 7 wherein said magnets provide a magnetizing force greater than the coersive force of the magnetic characters to be orientated.

10. A document processing apparatus according to claim 7 wherein the magnetic characters are magnetic ink characters.

* * * * *